March 20, 1945.  V. V. LONG  2,371,902
INDEX HEAD
Filed Feb. 10, 1942  2 Sheets-Sheet 1

INVENTOR.
Verne V. Long
BY
Victor J. Evans & Co.
ATTORNEYS

March 20, 1945.　　　V. V. LONG　　　2,371,902
INDEX HEAD
Filed Feb. 10, 1942　　　2 Sheets-Sheet 2

INVENTOR.
Verne V. Long
BY
Victor J. Evans & Co.
ATTORNEYS

Patented Mar. 20, 1945

2,371,902

UNITED STATES PATENT OFFICE 2,371,902

INDEX HEAD

Verne V. Long, Torrington, Wyo.

Application February 10, 1942, Serial No. 430,265

1 Claim. (Cl. 90—57)

This invention relates to an index head and has for an object to provide a simplified device of this character for use on milling machines and the like for cutting gear teeth, where the blank is required to be turned successively in order to bring it into position so that the cutting tool may act on the blank to cut the successive teeth.

A further object is to provide an index head in which one turn of the crank handle will advance the spindle of the device one-forty-eighth turn instead of the conventional one-fortieth, and a further object is to provide the index plate of the device with ten concentric annular rows of holes nine of these rows having an odd number, and one an even number of holes the largest number of holes in any one row being twenty-five, to the end that it will be easy for the operator to count off the right number of holes to make a setting without error.

A further object is to provide a device of this character having an index pointer passing diametrically through the index shaft for radial adjustment with relation to the index plate, the pointer being secured in its adjusted position by a nut on the index shaft, this pointer enabling the operator to take notice of the hole the pointer is indicating, then turn the crank handle the number of revolutions the chart specifies for that particular division, and insert a plug in that hole, thus reducing the probability of error.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming a part of this specification:

Figure 3:
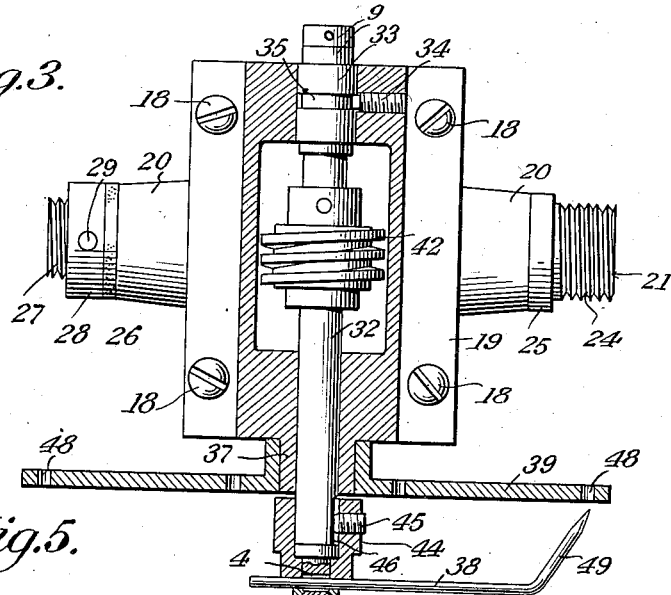
Figure 3 is a horizontal sectional view taken on the line 3—3 of Figure 2.

Referring now to the drawings in which like characters of reference designate similar parts in the various views, the index head comprises a casing 10 formed of two similar half sections to provide a base plate 11 having bolt openings 12 for bolting the casing to a milling machine or other machine. The similar sections of the casing are formed to provide a cylindrical body 13 having flanges 14 which are secured together by bolts 15, the cylindrical body terminating at the upper end in flanges 16 to which a single piece housing 17 is secured by bolts 18 passed through flanges 19 at the bottom of the housing. The cylindrical body is provided with aligned bearings 20 in which is rotatably mounted a hollow spindle 21, there being sleeve bushings 22 disposed in the bearings to receive the spindle. One end of the spindle is provided with a Morse taper 23 to receive an arbor of the blank carrying face plate while this end of the spindle is exteriorly threaded as shown at 24 to receive the face plate. A shoulder 25 is formed on the spindle and bears against the adjacent bearing 20. The opposite end of the spindle is provided with a friction brake in the nature of a leather washer 26 and this end of the spindle is also exteriorly threaded as shown at 27 to receive a knurled nut 28 to bind the friction brake against the adjacent bushing and adjacent tubular bearing. A set screw 29, see Figure 3, is engaged through the nut and may be advanced against the spindle to hold the nut against turning in cases where the work, that is the blank to be cut, might tend to turn. Under ordinary circumstances the frictional engagement of the brake 26 will be sufficient for this purpose.

A worm gear 30 is keyed to the spindle within the cylindrical body 13 as shown at 31.

Figures 2, 6:
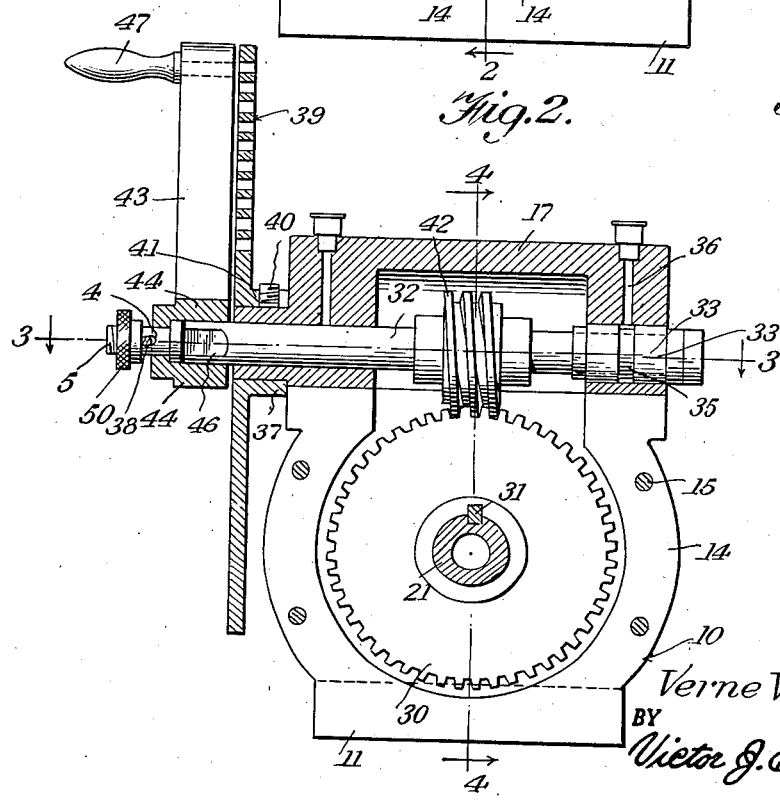
Figure 2 is a vertical sectional view taken on the line 2—2 of Figure 1.
Figure 6 is a detail perspective view of the plug.
Figure 5:
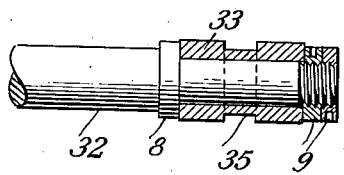
Figure 5 is a detail view of one end of the index shaft showing the bushing for facilitating oiling of the device.
Figure 4:
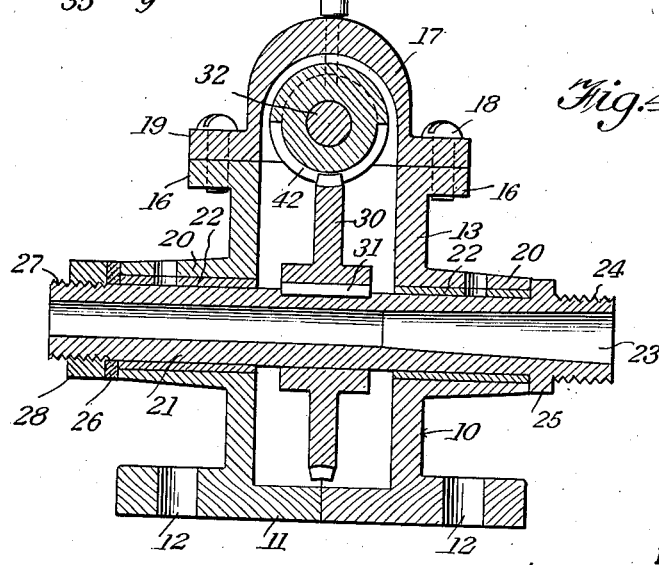
Figure 4 is a vertical sectional view taken on the line 4—4 of Figure 2.

An index shaft 32 is journaled at one end in a bushing 33 disposed in an opening in the housing and secured in place by a set screw 34 engaged in a circumferential slot 35 formed in the bushing, and also having lubricating channels 36 formed in the housing and communicating with the groove. A pair of lock nuts 9, see Figure 5 are threadedly engaged with the end of the index shaft and hold the bushing 33 in engagement with a collar 8 on the index shaft. The other end of the shaft is rotatably engaged through a tubular bearing 37 formed at the opposite end in the housing, this end of the shaft being equipped with a pointer 38 hereinafter described while an index plate 39 is mounted on the tubular bearing 37 through the medium of a set screw 40 engaged through a hub 41 on the index plate, see Figure 2. The index plate will also be hereinafter described in detail.

A worm pinion 42 is fixed to the index shaft 32 and meshes with the worm gear 30. The ratio of the pinion and gear is such that one complete revolution of the pinion advances the gear one tooth so that forty-eight revolutions of the index shaft are necessary to rotate the gear through a complete revolution and impart one complete revolution to the spindle 21.

For turning the index shaft a crank handle 43 is provided with a hub 44 which is secured to the pointer carrying end of the index shaft through the medium of a set screw 45 bearing against a flat surface 46 formed on the index shaft, see Figure 3. The crank handle is provided with a grip 47 for rotating the crank handle and the index shaft as a unit.

Figure 1:
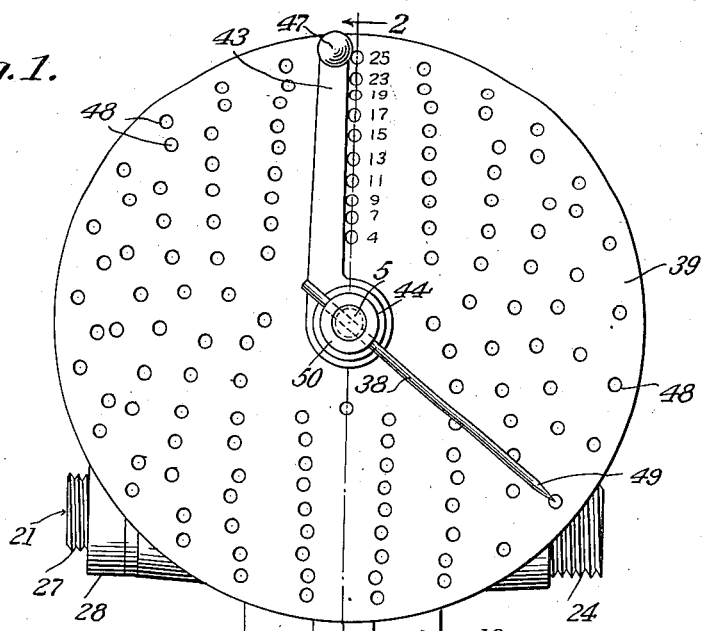
Figure 1 is a front elevation of an index head constructed in accordance with the invention.

The heretofore mentioned index plate 39, secured stationary to the tubular bearing 37, is provided with ten annular concentric rows of holes 48, and reading radially outward from the center of the index plate, see Figure 1, nine of the rows have an odd number of openings and one row has an even number of openings, the number of openings in the respective rows, reading as directed, being 4, 7, 9, 11, 13, 15, 17, 19, 23, and 25. The largest number of holes in any one row is 25 so that it is easy for the operator to count off the right number of holes to make a setting without error. As is customary the holes in a row denote divisions for setting the device to cut a corresponding number of gear teeth, the setting being accomplished by rotating the index shaft through a predetermined number of turns, and frictions thereof, indicated on a chart, not shown.

To make the setting of the device still more simple, easier and faster, the index pointer 38, heretofore mentioned, is in the form of a rod having a pointed angular end 49, see Figure 3, the rod passing diametrically through slot 4 in a threaded stud carried by the hub 44 for radial adjustment with relation to the index plate. The indicator pointer is secured in its adjusted position by a knurled nut 50 threadedly engaged on the end of the stud and contacting with the pointer to clamp the pointer to the hub 44. The pointer revolves with the index shaft. It is only necessary for the operator to count off the holes before he starts the job of work and sets the indicator pointer, and at each and every division after that the hand will point at the hole the index plate is to be pegged through the medium of a peg 51, see Figure 6. All that is necessary, is that the operator take notice of the hole the pointer is indicating, then turn the crank arm the number of revolutions the chart specifies for that particular division and insert the peg in the predetermined hole.

For obtaining the divisions of three hundred and sixty, or the degrees in a complete circle, it is necessary to use the index circle of fifteen holes, see Figure 1. In order to point out one degree divisions, the pointer is set the second hole from where the machine is set, in counting the hole the arm is set, and then moved up to this indicated hole after each operation, and the results are three hundred and sixty divisions. If half degrees are required, as is so often the case, one hole ahead or back will give the necessary division. The charts, not shown, showing the divisions of a circle, and the divisions of a circle in degrees, makes the machine easy to understand and operate.

From the above description it is thought that the construction and operation of the invention will be fully understood without further explanation.

What is claimed is:

In combination with an index head of the type having a rotary index shaft and a fixed index disk supported concentrically of the shaft, of a crank arm having a hub provided with a bore in its inner end slidably fitting on the outer end of the shaft, said hub having a bore in its outer end co-axial with and of smaller diameter than the bore in its inner end, said bores forming a shoulder in the hub, a stud extended through the outer bore of the hub having an enlarged head fitted within the inner bore between the shoulder and the end of the shaft, the outwardly projecting portion of the stud being exteriorly screw threaded and having a slot transversely therethrough, a pointer extending through said slot, and a nut threaded on the projecting portion of the stud for releasably clamping the pointer on the outer end of the hub.

VERNE V. LONG.